(12) United States Patent
Puttagunta et al.

(10) Patent No.: US 10,461,929 B2
(45) Date of Patent: Oct. 29, 2019

(54) UPDATING LOGIN CREDENTIALS OF AN ISCSI CLIENT IN A STORAGE AREA NETWORK

(71) Applicant: HEWLETT PACKARD ENTERPRISE DEVELOPMENT LP, Houston, TX (US)

(72) Inventors: Krishna Puttagunta, Rocklin, CA (US); Vivek Agarwal, Marlborough, MA (US); Rupin T Mohan, Northborough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 211 days.

(21) Appl. No.: 15/714,668

(22) Filed: Sep. 25, 2017

(65) Prior Publication Data

US 2019/0097797 A1 Mar. 28, 2019

(51) Int. Cl.
| | |
|---|---|
| *G06F 7/04* | (2006.01) |
| *H04L 9/08* | (2006.01) |
| *H04L 9/32* | (2006.01) |
| *G06F 21/31* | (2013.01) |
| *G06F 21/62* | (2013.01) |
| *H04L 29/06* | (2006.01) |
| *H04L 29/08* | (2006.01) |

(52) U.S. Cl.
CPC ............ *H04L 9/0891* (2013.01); *G06F 21/31* (2013.01); *G06F 21/62* (2013.01); *H04L 9/3226* (2013.01); *H04L 63/10* (2013.01); *H04L 67/1097* (2013.01)

(58) Field of Classification Search
CPC ....... G06F 21/31; G06F 21/62; H04L 67/1097
See application file for complete search history.

(56) References Cited

U.S. PATENT DOCUMENTS

| | | | |
|---|---|---|---|
| 7,367,050 B2 | 4/2008 | Mitsuoka et al. | |
| 7,853,994 B2 | 12/2010 | Shiga et al. | |
| 9,516,016 B2 | 12/2016 | Colgrove et al. | |

(Continued)

OTHER PUBLICATIONS

Synology Inc., "DS710+ Release Notes," (Web Page), retrieved online Jun. 13, 2017, 6 pages, https://originwww.synology.com/ko-kr/releaseNote/DS710.

(Continued)

*Primary Examiner* — Olugbenga O Idowu
(74) *Attorney, Agent, or Firm* — Hewlett Packard Enterprise Patent Department

(57) ABSTRACT

Examples relate to updating login credentials of an iSCSI client in a Storage Area Network (SAN). In an example, an iSNS server may send a target notification to an iSCSI target device, the target notification including an instruction for the target device to update a target-side record of login credentials for an iSCSI client. iSNS server may receive a first target response message from iSCSI target device. In response, iSNS server may provide updated login credentials for the iSCSI client to the iSCSI target device. iSNS server may receive a second target response message. In response, iSNS server may send a client notification to iSCSI client to update a client-side record of login credentials. iSNS server may receive a first client response message. In response, iSNS server may provide the updated login credentials to the iSCSI client.

20 Claims, 4 Drawing Sheets

(56) References Cited

U.S. PATENT DOCUMENTS

| | | | | |
|---|---|---|---|---|
| 2006/0165233 A1* | 7/2006 | Nonaka | ............... | G06F 21/10 |
| | | | | 380/44 |
| 2007/0055838 A1* | 3/2007 | Mitsuoka | ............ | G06F 3/0605 |
| | | | | 711/164 |
| 2013/0095789 A1* | 4/2013 | Keevill | ............... | H04W 12/06 |
| | | | | 455/411 |
| 2017/0139619 A1 | 5/2017 | Kang | | |

OTHER PUBLICATIONS

Vmware, Inc., "vSphere Storage," (Research Paper), May 15, 2014, 276 pages, https://pubs.vmware.com/vsphere-55/topic/com.vmware.ICbase/PDF/vsphere-esxi-vcente.

B. Aboba et al., "Securing Block Storage Protocols over IP," Apr. 2004, Network Working Group, Request for Comments: 3723 (RFC 3723), <https://tools.ietf.org/html/rfc3723>.

J. Satran et al., "Internet Small Computer Systems Interface (iSCSI)," Apr. 2004, Network Working Group, Request for Comments: 3720 (RFC 3720), <https://tools.ietf.org/html/rfc3720>.

J. Tseng et al., "Internet Storage Name Service (iSNS)," Sep. 2005, Network Working Group, Request for Comments: 4171 (RFC4171), <https://tools.ietf.org/html/rfc4171 >.

NetApp, Inc., "How iSCSI authentication works," May 2013, <https://library.netapp.com/ecmdocs/ECMP1196995/html/GUID-3FC8A37A-FFCC-4070-A9F0-1B9B3FB79BF8.html>.

Oracle Corporation, "How to Configure CHAP Authentication for Your iSCSI Initiator," 2010, <https://docs.oracle.com/cd/E19253-01/817-5093/fmvea/index.html>.

Oracle Corporation, "How to Configure CHAP Authentication for Your iSCSI Target," 2010, <https://docs.oracle.com/cd/E19253-01/817-5093/gdfuv/index.html>.

Oracle Corporation, "Using a Third-Party RADIUS Server to Simplify CHAP Management in Your iSCSI Configuration," 2010, <https://docs.oracle.com/cd/E19253-01/817-5093/fmveq/index.html>.

W. Simpson, "PPP Challenge Handshake Authentication Protocol (CHAP)," Aug. 1996, Network Working Group, Request for Comments: 1994 (RFC 1994), <https://tools.ietf.org/rfc/rfc1994.txt>.

\* cited by examiner

UPDATING LOGIN CREDENTIALS OF AN ISCSI CLIENT IN A STORAGE AREA NETWORK

BACKGROUND

Internet Small Computer Systems Interface (iSCSI) is an Internet Protocol (IP)-based storage networking standard for linking data storage facilities. iSCSI may provide block-level access to storage devices over a TCP/IP network. iSCSI may be used for location-independent data storage and retrieval over local area networks (LANs), wide area networks (WANs), or the Internet.

BRIEF DESCRIPTION OF THE DRAWINGS

For a better understanding of the solution, embodiments will now be described, purely by way of example, with reference to the accompanying drawings, in which.

Figure 1:
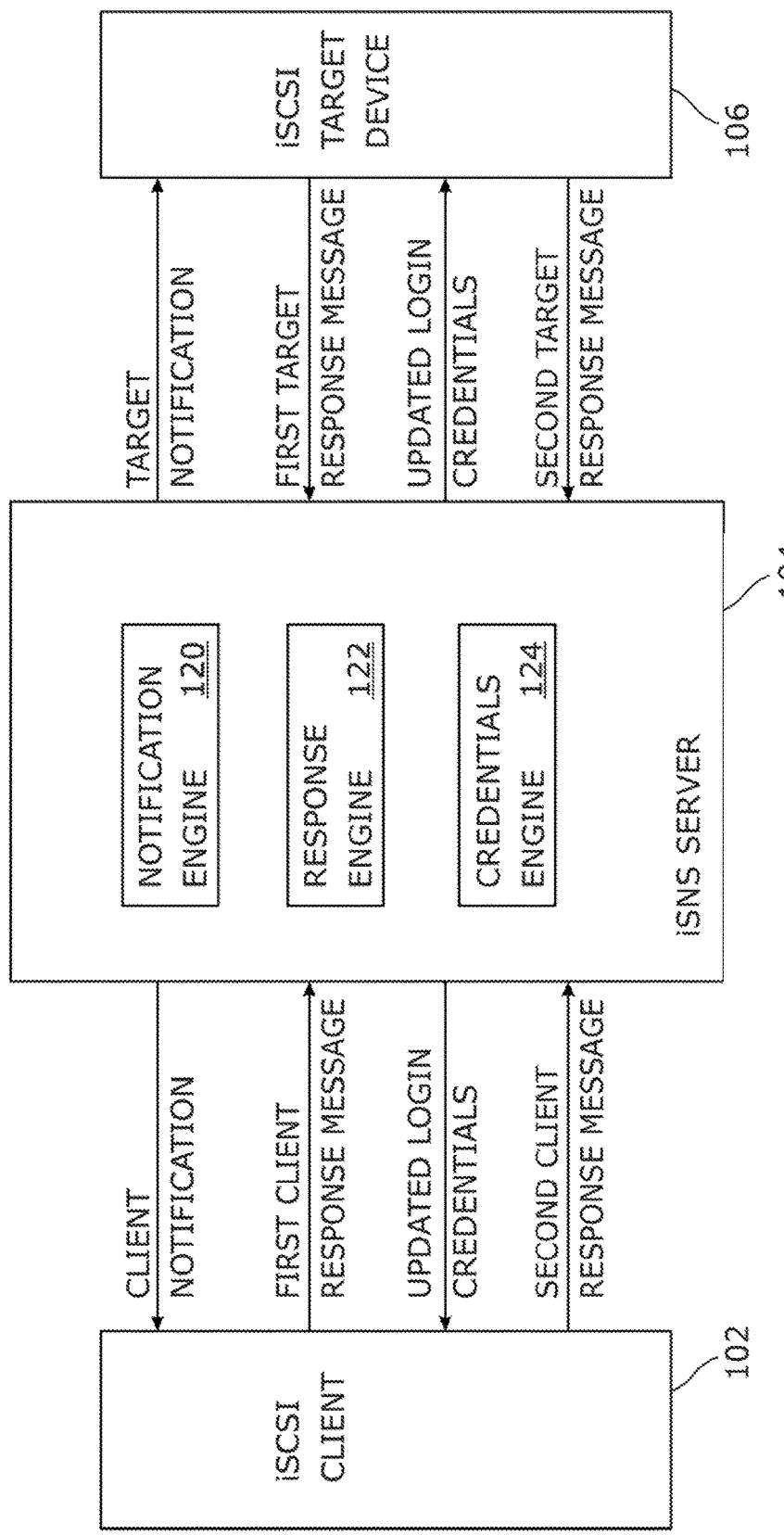
FIG. 1 is a block diagram of an example computing environment for updating login credentials of an iSCSI client.

DETAILED DESCRIPTION iSCSI is a storage area network (SAN) protocol that may allow organizations to consolidate storage into storage arrays while providing hosts (such as web servers) with the illusion of locally attached disks. The iSCSI protocol may allow clients (called initiators) to send SCSI commands to SCSI storage devices (targets) on remote servers.

Since iSCSI runs on standard Ethernet and uses TCP/IP protocol with well-known port numbers, it is vulnerable to spoofing and other attacks. To prevent this to some extent, iSCSI standard specifies using authorizations, authentications and encryption. Typically, enterprise networks may use bi-directional Challenge-Handshake Authentication Protocol (CHAP)-based authentications where both iSCSI server (target) and iSCSI client (initiator) may authenticate each other before transacting any I/O. However, since these authentications are carried out just once, and secrets shared between client and server are static, which may never change, once configured, they don't meet government regulations and compliance requirements. In general, some government regulations may require keys or secrets to be changed on a regular basis. Changing these keys or secrets manually may involve significant amount of work, especially as the size of the fabric increases, and may involve downtime for customers. Needless to say, this is not a desirable scenario.

To address these technical challenges, examples described herein provide a mechanism for updating login credentials of an iSCSI client in a Storage Area Network (SAN). In an example, an Internet Storage Name Service (iSNS) server may send a target notification to an Internet Small Computer System Interface (iSCSI) target device in a storage area network, the target notification including an instruction for the iSCSI target device to update a target-side record of login credentials for an iSCSI client. The iSNS server may receive a first target response message to the target notification from the iSCSI target device. In response to the first target response message, the iSNS server may provide updated login credentials for the iSCSI client to the iSCSI target device. The iSNS server may receive a second target response message from the iSCSI target device indicating that the target-side record of the login credentials for the iSCSI client has been updated. In response to the second target response message, the iSNS server may send a client notification to the iSCSI client, the client notification including an instruction for the iSCSI client to update a client-side record of its login credentials. The iSNS server may receive a first client response message to the client notification from the iSCSI client. In response to the first client response message, the iSNS server may provide the updated login credentials to the iSCSI client. The iSNS server may receive a second client response message from the iSCSI client indicating that the client-side record of its login credentials have been updated. The updated credentials may be useable by the iSCSI client to login to the iSCSI target device.

FIG. 1 is a block diagram of an example computing environment 100 for updating login credentials of an iSCSI client. Computing environment 100 may include an iSCSI client 102, an iSNS server 104, and an iSCSI target device 106. Although only one iSCSI client, one iSNS server, and one iSCSI target device are shown in FIG. 1, other examples of this disclosure may include more than one iSCSI client, more than one iSNS server, and more than one iSCSI target device.

iSCSI client 102 may be any type of computing device capable of executing machine-readable instructions. Examples of iSCSI client 102 may include, without limitation, a server, a virtual machine, a composable infrastructure appliance, a converged or hyperconverged appliance, a storage array controller, a rack-scale system, a desktop computer, a notebook computer, a tablet computer, a thin client, a mobile device, a personal digital assistant (PDA), a phablet, and the like. In an example, iSCSI client 102 may be referred to as iSCSI initiator.

iSCSI target device 106 may be a computing device, a storage device or a combination thereof. For example, iSCSI target device 106 may include, without limitation, a server, a desktop computer, a notebook computer, a tablet computer, a thin client, a mobile device, a personal digital assistant (PDA), and the like. In another example, iSCSI target device 106 may be an internal storage device, an external storage device, or a network attached storage device. Other examples of iSCSI target device 106 may include a hard disk drive, a storage disc (for example, a CD-ROM, a DVD, etc.), a storage tape, a solid state drive, a USB drive, a Serial Advanced Technology Attachment (SATA) disk drive, a Fibre Channel (FC) disk drive, a Serial Attached SCSI (SAS) disk drive, a magnetic tape drive, an optical jukebox, and the like. In other examples, iSCSI target device 106 may be a Direct Attached Storage (DAS) device, a Network Attached Storage (NAS) device, a Redundant Array of Inexpensive Disks (RAID), a data archival storage system, or a block-based device over a storage area network (SAN). In one example, iSCSI target device 106 may be a storage array, which may include one or more storage drives (for example, hard disk drives, solid state drives, etc.).

In an example, the physical storage space provided by iSCSI target device 106 may be presented as a logical storage space. Such logical storage space (also referred as "logical volume", "virtual disk", or "storage volume") may be identified using a "Logical Unit Number" (LUN). In another instance, physical storage space provided by iSCSI target device 106 may be presented as multiple logical volumes ("iSCSI targets"). In such case, each of the logical storage spaces ("iSCSI targets") may be referred to by a separate LUN. For example, if iSCSI target device 106 is a physical disk, a LUN may refer to the entire physical disk, or a subset of the physical disk or disk volume. In another example, if iSCSI target device 106 is a storage array comprising multiple storage disk drives, physical storage space provided by the disk drives may be aggregated as a logical storage space. The aggregated logical storage space may be divided into multiple logical storage volumes, wherein each logical storage volume may be referred to by a separate LUN. LUNs, thus, may be used to identify individual or collections of physical disk devices for address by a protocol associated with a Small Computer System Interface (SCSI), Internet Small Computer System Interface (iSCSI), or Fibre Channel (FC). Thus, in an example, iSCSI target device 106 may include one or more iSCSI targets.

iSCSI client 102, iSNS sever 104, and iSCSI target 106 may be in communication, for example, via a network. The network may be a wireless or wired network. The network may include, for example, a Local Area Network (LAN), a Wide Area Network (WAN), a Metropolitan Area Network (MAN), a Storage Area Network (SAN), a Campus Area Network (CAN), or the like. Further, the network may be a public network (for example, the Internet) or a private network (for example, an intranet). In an example, the network may be an iSCSI network.

iSCSI client 102 may communicate with iSCSI target device 106 via a suitable interface or protocol such as, but not limited to, Internet Small Computer System Interface (iSCSI), Fibre Channel, Fibre Connection (FICON), Hyper-SCSI, and ATA over Ethernet. In an instance, iSCSI client 102 may send SCSI commands over network to iSCSI target device 106.

Internet Storage Name Service (iSNS) server 104 may provide a centralized name service for all iSCSI nodes (for example, iSCSI client 102 and iSCSI target device 106) on one or more fabrics. iSNS server 104 may use the Internet Storage Name Service protocol to maintain information about active iSCSI devices (for example, iSCSI client 102 and iSCSI target device 106) on network, including their IP addresses, iSCSI node names, and portal groups. The iSNS protocol may enable automated discovery and management of iSCSI devices on an IP storage network. An iSCSI initiator (for example, 102) may query iSNS server 104 to discover iSCSI target devices (for example, 106).

As used herein, a "server" may refer to a computer program (machine-readable instructions) or process that is being executed by a processor and that may process requests from other (client) computers received over a network. In an example, iSNS server may include a computer program (machine-readable instructions) or process that may process requests, for example, from an iSCSI device.

In an example, iSNS server 104 may include a notification engine 120, a response engine 122, and a credentials engine 124.

Engines 120, 122, and 124 may be any combination of hardware and programming to implement the functionalities of the engines described herein. In examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. A processing resource may include any circuitry capable of executing machine readable instructions such as, without limitation, a processor, a co-processor, a microprocessor, a central processing unit (CPU), a microcontroller, etc. In some examples, the hardware may also include other electronic circuitry (for example, ASIC, CPLD, FPGA, discrete logic circuits, etc.) to at least partially implement at least one engine of iSNS server 104. In some examples, the at least one machine-readable storage medium may store instructions that, when executed by the at least one processing resource, at least partially implement some or all engines of iSNS server 104. In such examples, iSNS server 104 may include the at least one machine-readable storage medium storing the instructions and the at least one processing resource to execute the instructions.

In an example, notification engine on iSNS server 104 may send a target notification to iSCSI target device 106 on a network (for example, a SAN). The target notification may be a message that instructs the recipient (i.e., the iSCSI target device 106) to update a target-side record of login credentials for iSCSI client 102. The target-side record is a record maintained by the target device 106 of login credentials, which reflects the iSCSI target device's 106 current understanding of what the login credentials are. In an example, the target notification to the iSCSI target device 106 may be sent periodically based on a pre-defined frequency. In an example, the target notification to iSCSI target device 106 may be sent whenever updated login credentials are generated on iSNS server 104. In an example, the target notification from iSNS server 104 to iSCSI target device 106 may be triggered or sent by a user. In an example, the target notification to iSCSI target device 106 may be sent via an in-band network access. As used herein, "in-band" network access may refer to a network usage wherein the same network may be used to monitor and control a data network and to communicate data packets not used for management or control of that data network. In an example, during in-band network access, network management information (for example, via Simple Network Management Protocol (SNMP) packets) may travel the same network path as normal data packets (i.e., data packets whose content does not relate to management or control of that network). In an example, the target notification may comprise a state change notification (SCN).

In response to the target notification, iSNS server 104 may receive a first target response message from iSCSI target device 106. In an example, the first target response message may comprise a request from iSCSI target device 106 for the iSNS server 104 to provide updated login credentials for iSCSI client 102.

In response to the first target response message, iSNS server 104 may provide updated login credentials for iSCSI client 102 to iSCSI target device 106. In an example, the login credentials for iSCSI client 102 may be updated on iSNS server 104 on a periodic basis. The updated login credentials may be stored in a database in the iSNS server 104. In an example, the database may comprise a Lightweight Directory Access Protocol (LDAP) database. In an example, the updated login credentials may be automatically generated on iSNS server 104, for example, on a periodic basis. In an example, the updated login credentials may be generated on iSNS server 104 by a user. In an example, the updated login credentials may be stored in an encrypted form (for example, with AES-256 bit encryption) on the iSNS server 104. In an example, the login credentials may comprise Challenge-Handshake Authentication Protocol (CHAP)-based credentials. CHAP-based credentials are based on CHAP protocol. CHAP authentication is based on the concept of the challenge and response. The peer (authenticator) challenges the caller (authenticatee) to prove its identity. CHAP verifies the identity of the client by using a three-way handshake. This happens at the time of establishing the initial link. The verification is based on a shared secret (such as the client's password). After the completion of the link establishment phase, the authenticator sends a "challenge" message to the peer. The peer responds with a value calculated using a one-way hash function on the challenge and the secret combined. The authenticator checks the response against its own calculation of the expected hash value. If the values match, the authenticator acknowledges the authentication; otherwise it should terminate the connection.

Upon receiving the updated login credentials from the iSNS sever 104, the iSCSI target device 106 may update its target-side record of the login credentials based on the received updated credentials. For example, the iSCSI target device 106 may store the updated credentials in the target-side record, overwriting the previous version of the credentials. Once the login credentials for the iSCSI client 102 have been updated on iSCSI target device 106, iSNS server 104 may receive a second target response message from iSCSI target device 106 indicating that the login credentials for the iSCSI client 102 have been updated.

In response to the second target response message, iSNS server 104 may send a client notification to iSCSI client 102. The client notification may be a message that instructs the recipient (i.e., the iSCSI client 102) to update a client-side record of the login credentials used by iSCSI client 102 to login to iSCSI target device 106. The client-side record is a record maintained by the iSCSI client 102 of its own login credentials for logging in to the iSCSI target device 106, and the client-side record reflects the iSCSI client's 102 current understanding of what the login credentials are. In an example, the client notification to iSCSI client 102 may be sent via an in-band network access. In an example, the client notification may comprise a state change notification (SCN). In an example, in response to the client notification, an existing session between iSCSI client 102 and iSCSI target device 106 may be suspended by iSCSI client 102.

In response to the client notification, iSNS server 104 may receive a first client response message from the iSCSI client 102. In an example, the first client response message may comprise a request from iSCSI client 102 for the iSNS server 104 to provide updated login credentials for the iSCSI client 102.

In response to the first client response message, iSNS server 104 may provide the same updated login credentials to the iSCSI client 102 that were previously provided to iSCSI target device 106. This ensures that both iSCSI client 102 and iSCSI target device 106 have the same updated login credentials.

Upon receiving the updated login credentials from the iSNS sever 104, the iSCSI client 102 may update its client-side record of the login credentials based on the received updated credentials. For example, the iSCSI client 102 may store the updated credentials in the client-side record, overwriting the previous version of the credentials. Once the login credentials have been updated on iSCSI client 102, iSNS server 104 may receive a second client response message from iSCSI client 102 indicating that the login credentials have been updated.

In an example, the updated credentials may be used by iSCSI client 102 to login or re-login to iSCSI target device 106.

Figure 2:
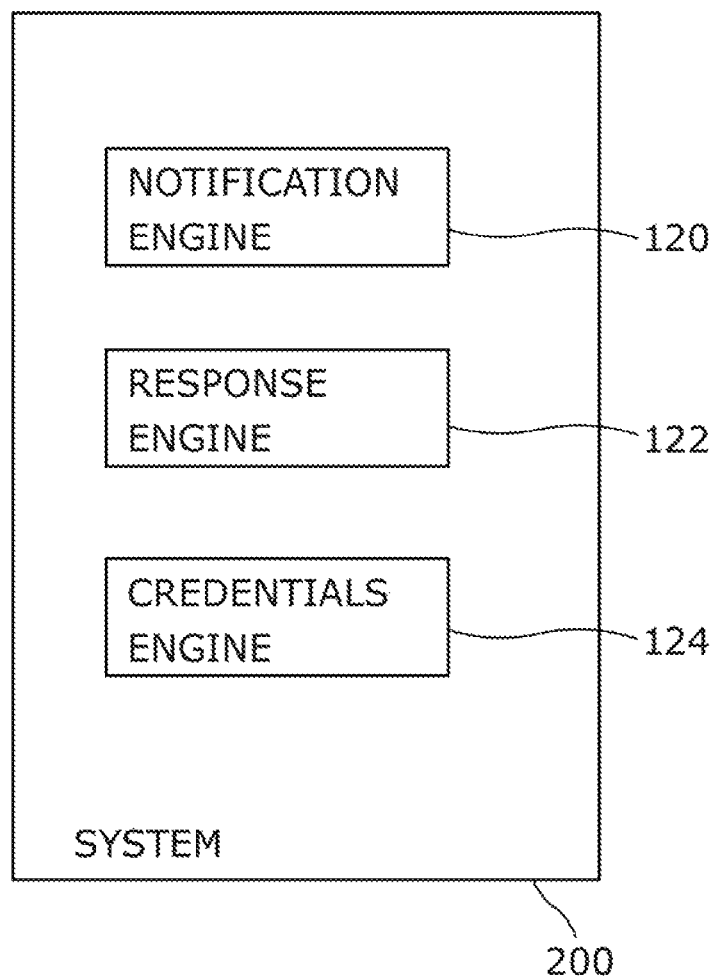
FIG. 2 is a block diagram of an example system for updating login credentials of an iSCSI client in a Storage Area Network (SAN)

FIG. 2 is a block diagram of an example system 200 for updating login credentials of an iSCSI client in a Storage Area Network (SAN). In an example, system 200 may be implemented by any suitable device, as described herein in relation to iSNS server 104 of FIG. 1, for example.

In an example, system 200 may include a notification engine 120, a response engine 122, and a credentials engine 124, as described above in relation to FIG. 1.

In an example, in response to generation of updated login credentials for the iSCSI client on the system, a notification engine may send a target notification to an Internet Small Computer System Interface (iSCSI) target device in a storage area network to update login credentials for an iSCSI client. In response, response engine may receive a first target response message to the target notification from the iSCSI target device. In response to the first target response message, credentials engine may provide updated login credentials for the iSCSI client to the iSCSI target device. In response, the response engine may receive a second target response message from the iSCSI target device indicating that the login credentials for the iSCSI client have been updated.

In response to the second target response message, the notification engine may send, a client notification to the iSCSI client to update the login credentials. In response, the response engine may receive a first client response message to the client notification from the iSCSI client. In response to the first client response message, the credentials engine may provide the updated login credentials to the iSCSI client. In response, the response engine may receive a second client response message from the iSCSI client indicating that the login credentials have been updated.

Figure 3:
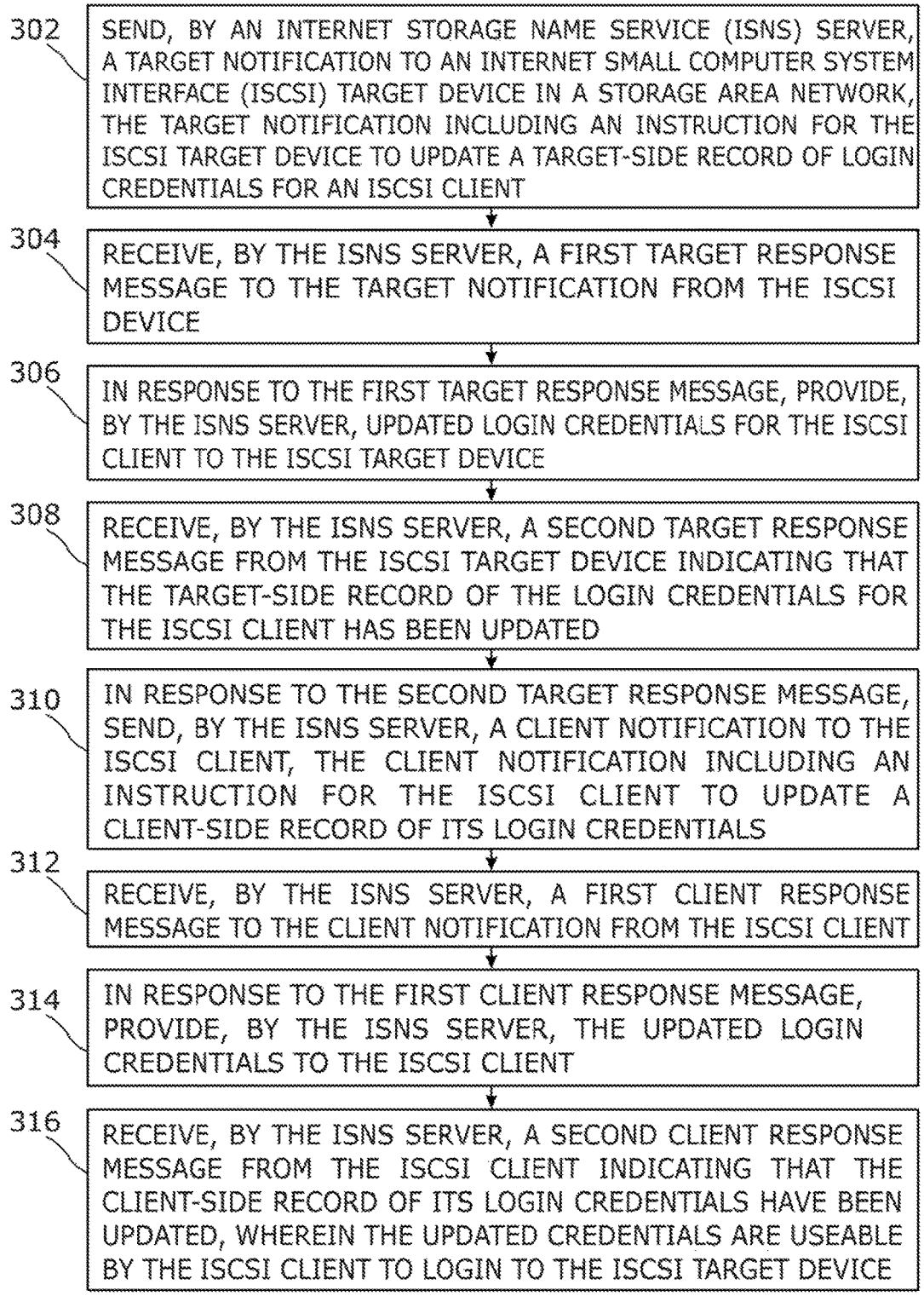
FIG. 3 is a block diagram of an example method of updating login credentials of an iSCSI client in a SAN.

FIG. 3 is a block diagram of an example method 300 for updating login credentials of an iSCSI client in a Storage Area Network (SAN). The method 300, which is described below, may be fully or partially executed on a system such as iSNS server 104 of FIG. 1, and system 200 of FIG. 2. However, other suitable network or computing devices may execute method 300 as well. At block 302, an Internet Storage Name Service (iSNS) server may send a target notification to an Internet Small Computer System Interface (iSCSI) target device in a storage area network, the target notification including an instruction to update a target-side record of login credentials for an iSCSI client. At block 304, the iSNS server 104 may receive a first target response message to the target notification from the iSCSI target device. At block 306, in response to the first target response message, the iSNS server may provide updated login credentials for the iSCSI client to the iSCSI target device. At block 308, the iSNS server may receive a second target response message from the iSCSI target device indicating that the target-side record of the login credentials for the iSCSI client has been updated. At block 310, in response to the second target response message, the iSNS server may send a client notification to the iSCSI client, the client notification including an instruction to update a client-side record of its login credentials. At block 312, the iSNS server may receive a first client response message to the client notification from the iSCSI client. At block 314, in response to the first client response message, the iSNS server may provide the updated login credentials to the iSCSI client. At block 316, the iSNS server may receive a second client response message from the iSCSI client indicating that the client-side record of its login credentials have been updated. The updated credentials may be useable by the iSCSI client to login to the iSCSI target device.

Figure 4:
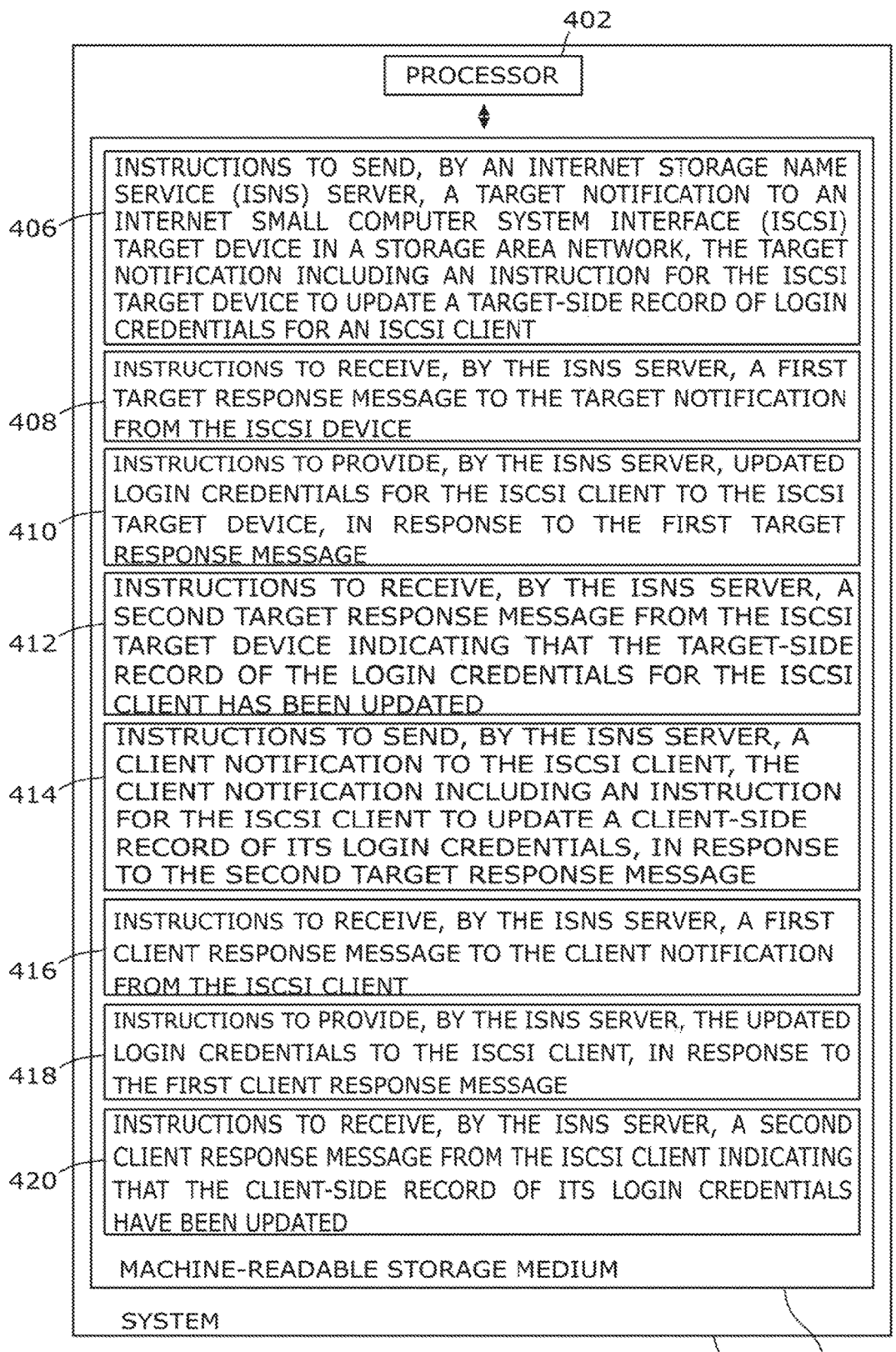
FIG. 4 is a block diagram of an example system including instructions in a machine-readable storage medium for updating login credentials of an iSCSI client in a SAN.

FIG. 4 is a block diagram of an example system 400 including instructions in a machine-readable storage medium for updating login credentials of an iSCSI client in a Storage Area Network (SAN). System 400 includes a processor 402 and a machine-readable storage medium 404 communicatively coupled through a system bus. In an example, system 400 may be analogous to network device 106 of FIG. 1, or network device 200 of FIG. 2. Processor 402 may be any type of Central Processing Unit (CPU), microprocessor, or processing logic that interprets and executes machine-readable instructions stored in machine-readable storage medium 404. Machine-readable storage medium 404 may be a random access memory (RAM) or another type of dynamic storage device that may store information and machine-readable instructions that may be executed by processor 402. For example, machine-readable storage medium 404 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium.

Machine-readable storage medium 404 may store instructions 406, 408, 410, 412, 414, 416, 418, and 420. In an example, instructions 406 may be executed by processor 402 send, by an Internet Storage Name Service (iSNS) server, a target notification to an Internet Small Computer System Interface (iSCSI) target device in a storage area network, the target notification including an instruction for the iSCSI target device to update a target-side record of login credentials for an iSCSI client. Instructions 408 may be executed by processor 402 to receive, by the iSNS server, a first target response message to the target notification from the iSCSI target device. Instructions 410 may be executed by processor 402 to provide, by the iSNS server, updated login credentials for the iSCSI client to the iSCSI target device, in response to the first target response message. Instructions 412 may be executed by processor 402 to receive, by the iSNS server, a second target response message from the iSCSI target device indicating that the target-side record of the login credentials for the iSCSI client have been updated. Instructions 414 may be executed by processor 402 to send, by the iSNS server, the client notification including an instruction for the iSCSI client to update a client-side record of its login credentials in response to the second target response message. Instructions 416 may be executed by processor 402 to receive, by the iSNS server, a first client response message to the client notification from the iSCSI client. Instructions 418 may be executed by processor 402 to provide, by the iSNS server, the updated login credentials to the iSCSI client, in response to the first client response message. Instructions 420 may be executed by processor 402 to receive, by the iSNS server, a second client response message from the iSCSI client indicating that the client-side record of its login credentials have been updated.

For the purpose of simplicity of explanation, the example method of FIG. 3 is shown as executing serially, however it is to be understood and appreciated that the present and other examples are not limited by the illustrated order. The example systems of FIGS. 1, 2, and 4, and method of FIG. 3 may be implemented in the form of a computer program product including computer-executable instructions, such as program code, which may be run on any suitable computing device in conjunction with a suitable operating system (for example, Microsoft Windows®, Linux®, UNIX®, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and/or steps are mutually exclusive.

The invention claimed is:

1. A method comprising:
   sending, by an Internet Storage Name Service (iSNS) server, a target notification to an Internet Small Computer System interface (iSCSI) target device in a storage area network, the target notification including an instruction for the iSCSI target device to update a target-side record of login credentials for an iSCSI client;
   receiving, by the iSNS server, a first target response message to the target notification from the iSCSI target device;
   in response to the first target response message, providing, by the iSNS server, updated login credentials for the iSCSI client to the iSCSI target device;
   receiving, by the iSNS server, a second target response message from the iSCSI target device indicating that the target-side record of the login credentials for the iSCSI client has been updated;
   in response to the second target response message, sending, by the iSNS server, a client notification to the iSCSI client, the client notification including an instruction for the iSCSI client to update a client-side record of its login credentials;
   receiving, by the iSNS server, a first client response message to the client notification from the iSCSI client;
   in response to the first client response message, providing, by the iSNS server, the updated login credentials to the iSCSI client;
   receiving, by the iSNS server, a second client response message from the iSCSI client indicating that the client-side record of its login credentials have been updated, wherein the updated credentials are useable by the iSCSI client to login to the iSCSI target device.

2. The method of claim 1, wherein the target notification to the iSCSI target device is sent based on a pre-defined frequency.

3. The method of claim 1, wherein the target notification to the iSCSI target device is sent whenever the updated login credentials are generated on the iSNS server.

4. The method of claim 1, wherein the target notification to the iSCSI target device is sent by a user.

5. The method of claim 1, wherein the updated login credentials are automatically generated on the iSNS server.

6. The method of claim 1, wherein in response to the client notification, an existing session between the iSCSI client and the iSCSI target device is suspended by the iSCSI client.

7. A system comprising:
a notification engine to send a target notification to an Internet Small Computer System Interface (iSCSI) target device in a storage area network, the target notification including an instruction for the iSCSI target device to update a target-side record of login credentials for an iSCSI client, in response to generation of updated login credentials on the system;
a response engine to receive a first target response message to the target notification from the iSCSI target device;
a credentials engine to provide, in response to the first target response message, the updated login credentials for the iSCSI client to the iSCSI target device;
the response engine to receive a second target response message from the iSCSI target device indicating that the target-side record of the login credentials for the iSCSI client has been updated;
the notification engine to send, in response to the second target response message, a client notification to the iSCSI client, the client-side notification including an instruction for the iSCSI client to update a client-side record of its login credentials;
the response engine to receive a first client response message to the client notification from the iSCSI client;
the credentials engine to provide, in response to the first client response message, the updated login credentials to the iSCSI client; and
the response engine to receive a second client response message from the iSCSI client indicating that the client-side record of its login credentials have been updated, wherein the updated credentials are useable by the iSCSI client to login to the iSCSI target device.

8. The system of claim 7, wherein the target notification to the iSCSI target device is sent via an in-band network access.

9. The system of claim 7, wherein the first target response message comprises a request from the iSCSI target device to provide the updated login credentials.

10. The system of claim 7, wherein the updated login credentials are stored in an encrypted form on the system, wherein the system is an iSNS server.

11. The system of claim 7, wherein the updated login credentials are stored in a database in the system, wherein the system is an iSNS server.

12. The system of claim 11, wherein the database comprises a Lightweight Directory Access Protocol (LDAP) database.

13. A non-transitory machine-readable storage medium comprising instructions, the instructions executable by a processor to:
send, by an Internet Storage Name Service (iSNS) server, a target notification to an Internet Small Computer System Interface (iSCSI) target device in a storage area network, the target notification including an instruction for the iSCSI target device to update a target-side record of login credentials for an iSCSI client;
receive, by the iSNS server, a first target response message to the target notification from the iSCSI target device;
in response to the first target response message, provide, by the iSNS server, updated login credentials for the iSCSI client to the iSCSI target device;
receive, by the iSNS server, a second target response message from the iSCSI target device indicating that the target-side record of the login credentials for the iSCSI client has been updated;
in response to the second target response message, send, by the iSNS server, a client notification to the iSCSI client, the client notification including an instruction for the iSCSI client to update a client-side record of its login credentials;
receive, by the iSNS server, a first client response message to the client notification from the iSCSI client;
in response to the first client response message, provide, by the iSNS server, the updated login credentials to the iSCSI client; and
receive, by the iSNS server, a second client response message from the iSCSI client indicating that the client-side record of its login credentials have been updated, wherein the updated credentials are useable by the iSCSI client to login to the iSCSI target device.

14. The storage medium of claim 13, wherein the login credentials comprise Challenge-Handshake Authentication Protocol (CHAP) credentials.

15. The storage medium of claim 13, wherein the updated login credentials are generated on the iSNS server by a user.

16. The storage medium of claim 13, wherein the storage area network comprises an iSCSI network.

17. The storage medium of claim 13, wherein the first client response message comprises a request from the iSCSI client to provide the updated login credentials.

18. The storage medium of claim 13, wherein the updated login credentials are automatically generated on the iSNS server periodically.

19. The storage medium of claim 13, wherein the client notification to the iSCSI client is sent via an in-band network access.

20. The storage medium of claim 13, wherein the target notification comprises a state change notification (SCN).

* * * * *